3,454,035
VALVE STRUCTURE WITH SEAT INSERT CENTERED BY CENTERING SURFACES
Hans Jorgen Jespersen, Ulkebol, Denmark, assignor to Danfoss A/S, Nordborg, Denmark, a company of Denmark
Filed Oct. 28, 1966, Ser. No. 590,306
Claims priority, application Germany, Nov. 4, 1965, D 48,580
Int. Cl. F16k 1/44, 1/46; F25b 41/04
U.S. Cl. 137—315     13 Claims

ABSTRACT OF THE DISCLOSURE

To permit easy insertion of a valve element in an apertured valve sleeve having valve seats, the valve sleeve is retained in the valve housing in a chamber larger than the valve sleeve and seats in the housing by means of conical, round or similar seats so that it can be canted upon insertion; the seal of the valve sleeve is then accomplished at the side thereof against the inlet or outlet stub formed in the housing.

---

The present invention relates to a valve structure, and more particularly to a valve structure in which the movable valve element operates within a sleeve which can be inserted in the housing and is sealed therein.

The valve according to the present invention is particularly useful as an expansion valve in cooling or refrigeration apparatus. The structure lends itself to ready manufacture by mass production technique, and particularly to manufacture of components by automatic screw machines, automatic lathes or the like.

An insert sleeve, which may be mass produced accurately on automatic machinery is seated by means of a seal within a housing. One seal must be provided to prevent leakage of fluid from the inlet into the insert sleeve; another sealing arrangement must be provided to seal the space on either side of the valve seats, to provide effective separation of inlet, and outlet openings. It has been previously proposed to provide valves of this type in which the seal of the insert against the valve housing, and the seal of the valve seat itself was arranged concentrically, more particularly concentrically with respect to the central axis of the insert. Such valves have the disadvantage that their assembly and manufacture was rather difficult, and that the path of the fluid was complicated. Further, mass production was difficult because the seals had to be individually matched to valve seats or manufacturing tolerances had to be maintained to an uneconomical small level. Further, concentric arrangements had the disadvantage that the insert might expand, due to heating, at a rate different from the expansion of the outer housing, thus causing compressive deformation and malfunctioning of the valve element.

The use of O-rings resulted in a valve which avoided some of the above difficulties; however, it was difficult to form a suitable housing; castings or forgings were necessary and subsequent machining increased manufacturing costs. Additionally, as the O-rings were inserted, they were subject to damage during assembly and thus resulted in leakage and rejects of the entire valve, which was not discoverable until they were finally tested after complete assembly.

It is an object of the present invention to provide a valve structure which can be readily manufactured, the parts of which can be made on automatic, or semi-automatic machinery, and which is easy to assemble.

Briefly, in accordance with the present invention, the valve structure has a housing in which a chamber is formed which is larger than the valving chamber itself. A hollow valve seat insert is located in the chamber; a lateral aperture is formed in the hollow valve seat insert to communicate with an inlet to the housing and thus to the chamber; its hollow interior communicates with the outlet of the housing. The valve stem is located directly within the seat insert, and operated concentrically therewith. A single sealing element is provided laterally, that is on the outer side of this valve seat insert. Upon assembly, the valve seat insert is canted and seated at one end in the chamber of the housing. It is then brought into concentric relationship to the chamber, that is it is straightened, and the seal surrounding the aperture will press against a matching set formed on the inside of the chamber. Thus, damage to the seal is avoided because there is sufficient clearance within the chamber for easy insertion initially, the insert can be made completely cylindrical and thus on automatic machinery, and the valve stem itself can likewise be made on automatic machinery to match valve seats formed in the inside of the insert. Only a single seal is necessary. The entire assembly, once oriented within the chamber, can then be secured together by means of screws or the like.

No close manufacturing tolerances are necessary, and parts can readily be replaced. All chambers can be manufactured on automatic or semi-automatic rotating machinery, decreasing production costs.

The construction further permits the manufacture of valves in which the inlet and outlet connections are aligned; during manufacture they can be bored in a single manufacturing step; inserts can be used afterwards to match the valve seat insert against the inner walls of the chamber, if the inner walls have been bored to dimensions not matching those of the valve seat insert.

The structure, organization and operation of the invention will now be described more specifically in the following detailed description with reference to the accompanying drawings, in which.

Figure 1:
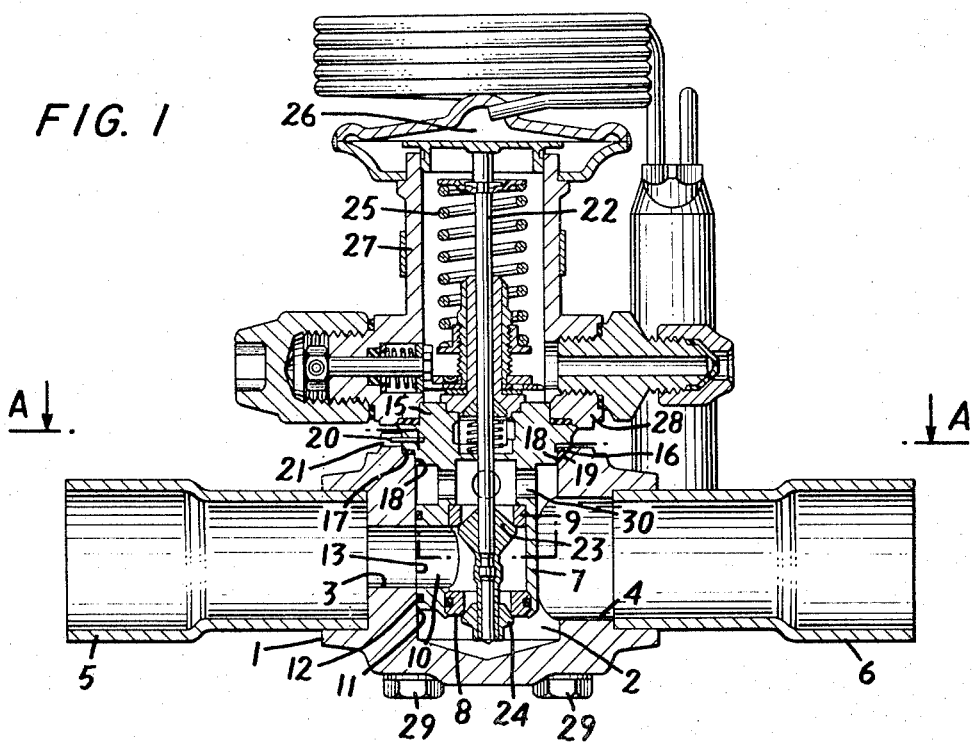
FIG. 1 is a longitudinal cross-sectional view of a valve in accordance with the present invention.
Figure 2:
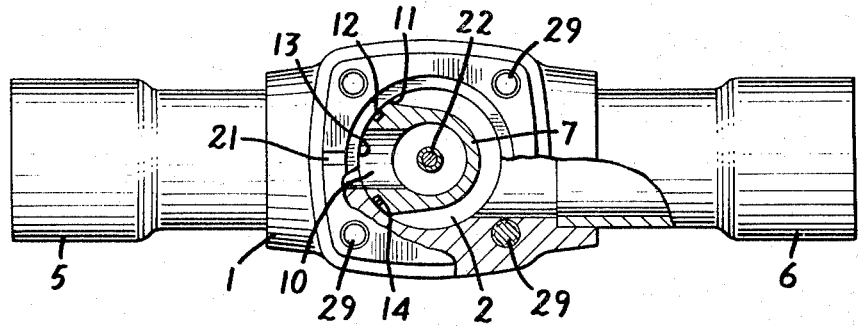
FIG. 2 is a top view of FIG. 1, the insert in section along line A—A of FIG. 1.

Referring now to the drawings, and particularly to FIGS. 1 and 2: valve housing 1 has a cylindrical inner chamber 2, as well as a pair of co-concentric ducts 3 and 4 terminating in chamber 2. An inlet stub 5 is connected to inlet duct 3; outlet tube 6 is connected to duct 4.

Chamber 2 is fitted with a hollow valve seat insert 7, formed with a pair of valve seats 8 and 9. Insert 7 is closed between seats 8 and 9 on one side, but formed with a lateral aperture 10, having a bearing surface 11 formed thereon. An O-ring seal 12 is set into the surface 11 and bears against a matching surface in the chamber 13. Surface 11 is, as clearly seen in FIG. 2, a portion of a cylinder, which matches the interior diameter of the chamber 2. Chamber 2, itself, is cylindrical. Axes of the cylindrical housing and the axes of the aperture of the cylindrical insert intersect each other at approximately right angles. O-ring 12 is inserted in a notch 14 in the cylindrical bearing surface 11 formed on insert 7. The interior walls of notch 14 are approximately perpendicular to the cylindrical surface, so that they will retain O-ring 12 securely therein.

The insert 7 is retained in place by a flange 15. Flange 15 itself rests, with a seal 16 interposed, on a matching surface 17 of the housing. Immediately below, a cylindrical centering surface 18 is formed on the insert, which cooperates with a matching centering surface 19 of the housing. Both centering surfaces have a clearance correspondent to approximately an easy slip fit. A pin 20, fitting into a radial notch 21 of the housing, secures the insert and the housing together in the proper relative position.

The upper end of the insert is formed with lateral bores 30 in order to provide for communication from the top of the insert to the chamber where the valve opens. See FIG. 1.

The valve shaft 22 has a pair of valve members 23, 24. It is operated by means of a compression spring 25 and by the pressure of a membrane 26. The parts 25, 26 are contained in a control attachment 27, a bottom end 28 of which seats on insert 7. Attachment 27 is secured to housing 1 by means of screws 29 and presses flange 15 of the insert to the matching seating surface 17 of the housing. All other parts of the control attachment are not necessary for an understanding of the present invention and will not be described in detail.

In operation, the medium to be regulated, such as a refrigerating gas, is supplied over inlet tube 5; it enters through aperture 10 into the valve insert 7 between the two valve seats 8 and 9. If the valve is opened, it then passes past seat 8 and seat 9 and cross bores 30 into the portion of the chamber beyond insert 7, and can be taken off chamber 2 from the outlet 4 and stub 6.

Assembly of the valve according to the present invention is simple. The valve shaft and insert assembly is inserted into the chamber 2 from above, in such a manner that pin 20 engages the radial notch 21 and that the central axes of insert 7 is canted with respect to the outlet duct 4. Both matching surfaces 11 and 13, adjacent the aperture 10, are then spaced from each other by a small distance. Insert 7 is then tipped above pin 20, or about the surface 13 adjacent the side of pin 20, until the sealing ring 12 snugly fits against surface 13. Then assembly 27 is secured by means of screws 29. The required pressure on seal 20 against the outlet surface 13 is thus obtained.

Centering surface 18 need not be cylindrical, but may be a cross section of a sphere or a cone; the pictorial representation in the drawing would not change with such a modification.

Figure 3:
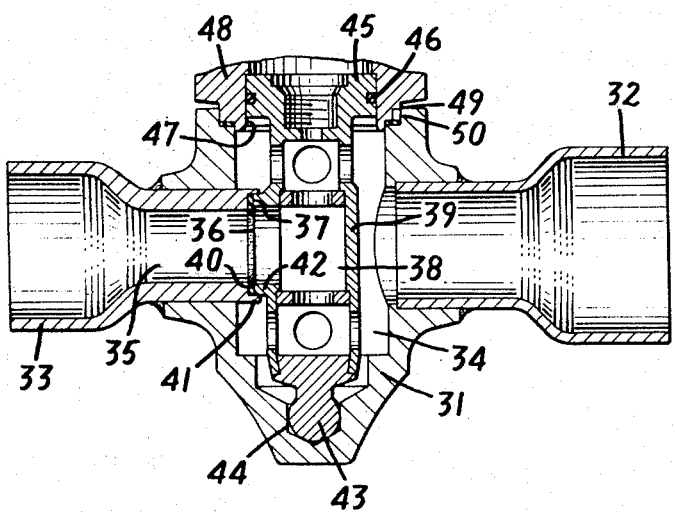
FIG. 3 is a partial longitudinal view of another embodiment of the present invention.

FIG. 3 shows a modification in which housing 31 contains an outlet duct 32 similar to the form shown in FIG. 1. Inlet duct 33, however, is carried into the interior 34 and forms, itself, a duct which passes through the housing and at its end surface 36 further provides the bearing surface against which bearing surface 37 of insert 39, surrounding aperture 38 therein, can seat. The O-ring 40 is secured against the surface 36. The surface is further formed with a ring-shaped flange 41, is engaged by a projection 42 surrounding aperture 38, in order to provide for positive axial alignment.

Insert 39 is formed at its lower end with a spherical bearing point 43, fitting into a matching bore 44 of housing 31. The upper end is formed with a flange 5, in which a ring seal 46 is secured axially in a central bore 47 of the control assembly 48. The control assembly 48 is secured, by means of a seal 49, to housing 31 and centered thereon at its centering surface 50.

In assembly, insert 39 is again placed into the chamber 34 from above, and canted sideways, until sphere 43 fits in the bore 44. Thereafter, control assembly 48 is placed thereon and the entire assembly is tipped, or canted until it can fit on its seat in housing 31. The surface 37 will then bear against seal 40 with proper force.

Figure 4:
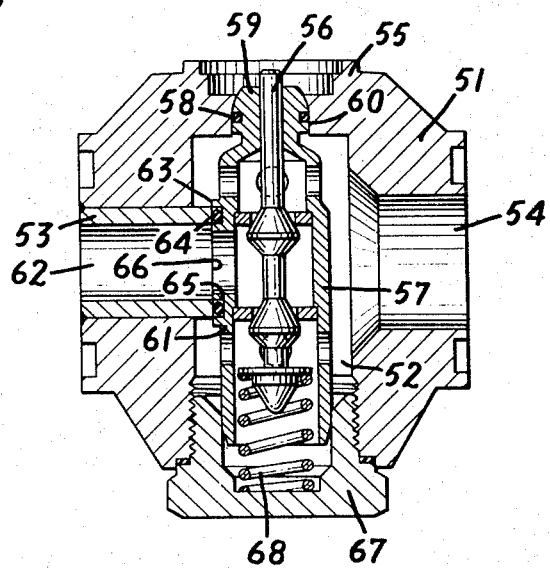
FIG. 4 is a partial longitudinal view of yet another embodiment.

FIG. 4 illustrates a valve housing 51, having a chamber 52, to which a stub tube 53 is assembled, forming an inlet. Outlet stub 54 is likewise formed in the housing. It is accessible from the outside. Upper flange 55 is provided on which a control assembly can be placed, not shown in this figure. The shaft of the control assembly act on the valve shaft 56. The insert 57 in this embodiment is placed from the bottom and fits with a spherical upper end 59, supplied with a seal 58 in a matching bearing bore 60 of the housing. A short stub 61 is provided, formed with a lateral aperture 62. At its face surface 63, a seal 64 is provided located within a ring-shaped notch 65, bearing against surface 66 of the inlet stub 53. The insert is placed from below, canted or tilted with respect to the axis it is eventually to have, and secured in its centered and straight position by means of a plug 67. Plug 67 can be formed with a recess to secure valve spring 68.

Figure 5:
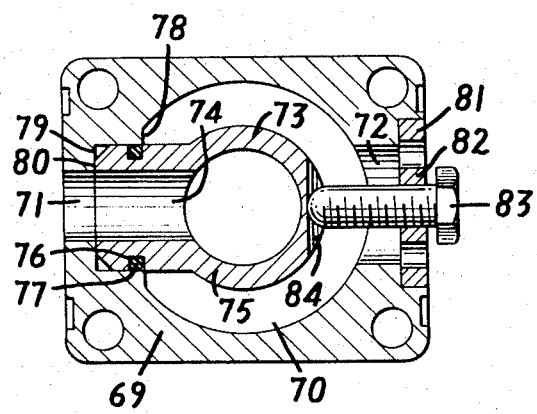
FIG. 5 is a horizontal section of an insert of yet another embodiment, with respect to a center line of the valve.

FIG. 5 illustrates an embodiment of the invention in which a housing 69 is formed with a chamber 70, with which a pair of bores 71, 72 communicate. An insert 73, carrying valve seats, is shown only schematically. It has an aperture 74, to which a longitudinal extension 75 is secured, having a ring-shaped notch 76 at its face to which an O-ring 77 is secured. O-ring 77 contacts an enlarged face in chamber 70. The region of the chamber adjacent the inlet bore 71 is formed in a pair of sections 78, 79, so that section 79 can form a seat for the face 80 of projection 75 surrounding opening 74. The outlet bore 72 has a spider 81 inserted therein, the central hub 82 of which is formed with a screw thread holding a screw 83. Screw 83 bears against a surface 84 formed on insert 73 in the region opposite aperture 74.

Insert 74 is placed into the chamber either from the top or the bottom, depending upon whether the general construction of FIG. 3 or FIG. 4 is used. Screw 83 is retracted. Sufficient clearance is provided to place insert 73 properly, and without damage to the sealing surfaces. Once the insert 73 is located, screw 83 is tightened. Insert 73 may be located in the chamber by placing it straight, or inserting it canted. The insert can be retained in position by concentric seating surfaces, similar to those shown in FIGS. 1 and 2, or by a tilting or pivoting end similar to the ball and socket arrangement of FIG. 3; or other suitable means.

Various modifications may be made in the arrangement of the valve according to the present invention without departing from the scope. For example, the lower swinging joint shown in FIG. 3 may be replaced by a projection which is somewhat hollow and fits on a lower pin. Other means to provide tilting joints may be provided; for example, the insert may be formed with rounded lower sides, discs having the approximate diameter of the chamber diameter and otherwise slightly bowed or spherically formed surfaces. The present invention is particularly suitable for double-seat valves. When using a single seat valve, the openings of 30 of FIG. 1 may be omitted; the insert may be closed off at the bottom.

The chamber is preferably cylindrical, and machined by being bored or drilled; machining costs are cheap and can readily be made accurately.

The ball-and-socket arrangement 43 of FIG. 3 may be secured in position by means of a screw passing through the housing and seating against a flattened surface on the sphere, or in the notch between the sphere and end of the insert.

Other variations and constructional changes within the scope of the present invention will readily suggest themselves. For example, the valve stem, for other applications or for check valve applications may be replaced by balls which are spring-loaded and retained within the insert by springs similar to spring 68, FIG. 4.

I claim:
1. Valve structure comprising a housing having a chamber formed therein, inlet and outlet openings in communication with said chamber;
   a hollow valve seat insert located in the chamber of said housing, said insert being formed with a lateral aperture located to be in communication with one of said housing openings and having its hollow in- terior in communication with the other of said housing openings when the valve is open;

a valve means located within said seat insert, said insert and said valve means being formed with matching valve seats, and said valve means being axially movable within said insert to provide for opening and closing of the valve; said valve seat insert having an outer surface surrounding said lateral aperture bearing against a matching surface on said chamber; sealing means arranged between said surface, said insert being smaller than the internal dimensions of said chamber and laterally movable therein during assembly of the valve structure;

means securing said insert in said housing with said surfaces and said interposed sealing means in sealing engagement, and said means securing said insert in said housing engaging said insert unsymmetrically to act on said insert in a direction to cant said insert toward sealing engagement with said surface, whereby during assembly, the insert may be placed in said chamber with clearance from the sealing surface in the chamber, and damage to the matching sealing surfaces and the sealing means during assembly avoided.

2. Valve structure as claimed in claim 1 wherein said means securing said insert in said housing include pressure means releasably pressing said insert and said housing together in sealing engagement.

3. Valve structure as claimed in claim 1 wherein said sealing means is elastic and concentric with said aperture.

4. Valve structure as claimed in claim 3 wherein said sealing means is an O-ring and said surface is formed with a notch receiving said O-ring.

5. Valve structure as claimed in claim 1 wherein said chamber is cylindrical, said insert is a cylindrical sleeve of lesser diameter than the diameter of the chamber, and the inlet and outlet openings are cylindrical.

6. Valve structure as claimed in claim 4 wherein the insert is cylindrical and the aperture is cylindrical having an axis intersecting the axis of the cylindrical insert at right angles; and said walls of the notch are approximately perpendicular to the plane formed by the intersection of the aperture with the cylindrical insert.

7. Valve structure as claimed in claim 1 wherein at least one of said openings is defined by the tubular projections extending into said chamber; said tubular projection having said surface formed at the end thereof.

8. Valve structure as claimed in claim 2 wherein said pressure means act on the insert opposite to the side having the aperture formed therein.

9. Valve structure as claimed in claim 1 wherein said means securing said insert in said housing include a locating seat comprising matching centering surfaces formed on said insert and in said chamber, said matching centering surfaces being rounded with respect to each other to provide for self-alignment.

10. Valve structure as claimed in claim 9 wherein said centering surfaces are spherical.

11. Valve structure as claimed in claim 1 wherein said means securing said insert in said housing include a bearing member in sealing engagement with said insert, and a pin engaging said bearing member through said housing to secure said insert in position within said chamber.

12. Valve structure as claimed in claim 1 wherein the chamber is cylindrical and formed with seating surfaces in the region of the inlet opening; said valve seat insert is cylindrical and of lesser diameter than the diameter of the chamber; said valve seat insert being formed with an outer sealing surface of a diameter similar to the diameter of the chamber to provide for a matching sealing engagement therewith.

13. Valve structure comprising a housing having a chamber formed therein, inlet and outlet openings in communication with said chamber;

a hollow valve seat insert located in the chamber of said housing, said insert being formed with a lateral aperture located to be in communication with one of said housing openings and having its hollow interior in communication with the other of said housing openings when the valve is open;

a valve means located within said seat insert, said insert and said valve means being formed with matching valve seats, and said valve means being axially movable within said insert to provide for opening and closing of the valve; said valve seat insert having an outer surface surrounding said lateral aperture bearing against a matching surface on said chamber; sealing means arranged between said surfaces, said insert being smaller than the internal dimensions of said chamber and laterally movable therein during assembly of the valve structure;

means securing said insert in said housing with said surfaces and said interposed sealing means in sealing engagement, said means securing said insert in said housing including a tilt joint forming a ball-and-socket connection, to permit canting of said insert during assembly; and a locating seat to locate said insert in said housing after assembly, whereby during assembly, the insert may be placed in said chamber with clearance from the sealing surface in the chamber, and damage to the matching sealing surfaces and the sealing means during assembly avoided.

References Cited

UNITED STATES PATENTS

| | | | |
|---|---|---|---|
| 1,988,966 | 1/1935 | Eckhouse | 137—454.6 |
| 2,074,839 | 3/1937 | Gibson | 137—454.2 |
| 3,000,393 | 9/1961 | Maynard | 137—454.2 |
| 3,025,873 | 3/1962 | Bay | 137—454.2 |
| 3,111,136 | 11/1963 | Persidsky | 137—315 |
| 3,347,260 | 10/1967 | Lewis | 137—454.6 XR |

HAROLD W. WEAKLEY, *Primary Examiner.*

U.S. Cl. X.R.

137—454.6, 625.34